United States Patent
Kimura (10) Patent No.: US 7,660,974 B2
(45) Date of Patent: Feb. 9, 2010

(54) METHOD AND APPARATUS FOR ANALYZING PERFORMANCE, AND COMPUTER PRODUCT

(75) Inventor: Shigeru Kimura, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 105 days.

(21) Appl. No.: 11/524,398

(22) Filed: Sep. 21, 2006

(65) Prior Publication Data

US 2007/0220237 A1  Sep. 20, 2007

(30) Foreign Application Priority Data

Mar. 15, 2006  (JP) .............. 2006-071335

(51) Int. Cl.
G06F 11/32  (2006.01)
G06F 11/30  (2006.01)

(52) U.S. Cl. .............. 712/227; 714/34; 714/47

(58) Field of Classification Search .............. 717/125, 717/127, 130; 712/227; 714/34, 38, 46, 714/47

See application file for complete search history.

(56) References Cited

U.S. PATENT DOCUMENTS 5,355,487 A * 10/1994 Keller et al. ............ 717/127
6,230,313 B1 * 5/2001 Callahan et al. ............ 717/128
7,020,768 B2 * 3/2006 Swaine et al. .............. 712/228
7,080,289 B2 * 7/2006 Swaine et al. .............. 714/45
7,093,108 B2 * 8/2006 Swaine ...................... 712/227
2006/0230391 A1 * 10/2006 Alexander et al. .......... 717/130
2007/0220237 A1 * 9/2007 Kimura ...................... 712/227

FOREIGN PATENT DOCUMENTS

| JP | 05-035549 | 2/1993 |
| JP | 06-083608 | 3/1994 |
| JP | 09-034850 | 2/1997 |
| JP | 2004-318538 | 11/2004 |

* cited by examiner

Primary Examiner—William M Treat
(74) Attorney, Agent, or Firm—Staas & Halsey LLP

(57) ABSTRACT

In a performance analyzing apparatus, a setting unit sets an event of which the performance is desired to be monitored, a detecting unit detects an instruction address at the time of generation of an interrupt signal from a timer, and a calculating unit calculates a variation amount of a counted value by a hardware counter at a detected instruction address. The variation amount is accumulatively retained for each detected instruction address. A specifying unit specifies an instruction address that corresponds to the event, and a display unit displays a graph of the total variation amounts.

13 Claims, 6 Drawing Sheets

| INSTRUCTION ADDRESS | ASSEMBLY INSTRUCTION | TOTAL VARIATION AMOUNT |
|---|---|---|
| 00001000 | ADD | 00000001 |
| 00001004 | MOV | 00000039 |
| 00001008 | LD | 00000080 |
| ⋮ | ⋮ | ⋮ |

METHOD AND APPARATUS FOR ANALYZING PERFORMANCE, AND COMPUTER PRODUCT

CROSS-REFERENCE TO RELATED APPLICATIONS

This application is based upon and claims the benefit of priority from the prior Japanese Patent Application No. 2006-071335, filed on Mar. 15, 2006, the entire contents of which are incorporated herein by reference.

BACKGROUND OF THE INVENTION

1. Field of the Invention

The present invention relates to a technology for analyzing performance of a program that is run on a processor.

2. Description of the Related Art

Most current processors have a hardware counter for monitoring performance by counting events in the processor and events of interactions with the exterior.

For example, a Pentium (registered trademark) processor of Intel Corporation has a plurality of counters and is configured to be capable of selecting an event from various events such as a clock frequency, the number of executive instructions, and the number of cache mistakes, and to count the selected event. A Performance Optimization With Enhanced RISC for Personal Computer (power PC) processor from International Business Machines Corporation is configured similarly and is capable of selecting a counter from plural counters to count an event.

Therefore, program running state information, such as the number of execution cycles, and bottleneck information, such as the number of cache mistake cycles, can be obtained. Thus, a mechanism to provide information useful for improving software programs and performance is incorporated as hardware in a processor.

For example, a technique utilizing a hardware counter in a processor is disclosed (for example, Japanese Patent Laid-Open Publication No. 2004-318538). A technique that displays an event of software by generating the event and tracing the event to detect a bottleneck of software or a system is disclosed (for example, Japanese Patent Laid-Open Publication Nos. H9-34850, H6-83608, and H5-35549). In the technique disclosed in Japanese Patent Laid-Open Publication Nos. H9-34850, H6-83608, and H5-35549, events of software (task names, function names, etc.) are handled.

Generally, a hardware counter is incorporated in a processor as a dedicated circuit and this dedicated circuit has a simple configuration only for accumulatively counting hardware event signals to save the area in the processor. Therefore, information acquired from the hardware counter (architecture information such as a pipeline stall, memory traffic, bus load information, etc.) is output as accumulated information for a specific section. Therefore, although information on the entire specific section can be acquired, information at micro intervals can not be acquired.

This acquired information can not be screened to a "point". The acquired information is section information as a "plane". Therefore, tuning and feedback to the system design based on the acquired information lack concreteness and tend to be ambiguous and abstract. Therefore, it is difficult to probe a tuning point.

SUMMARY OF THE INVENTION

It is an object of the present invention to at least solve the above problems in the conventional technologies.

A performance analyzing apparatus according to one aspect of the present invention includes a setting unit configured to set an event for which number of times of occurrence are counted by a hardware counter provided in a processor on which a program to be analyzed is executed; a detecting unit configured to detect instruction addresses at a time of generation of interrupt signals that are generated at predetermined time intervals from the processor while the program is being executed; a calculating unit configured to calculate a total amount of variation in values counted by the hardware counter for each of the instruction addresses; and a display control unit configured to control a display unit to display the total amount of variation for each of the instruction addresses.

A performance analyzing method according to another aspect of the present invention includes setting an event for which number of times of occurrence are counted by a hardware counter provided in a processor on which a program to be analyzed is executed; detecting instruction addresses at a time of generation of interrupt signals that are generated at predetermined time intervals from the processor while the program is being executed; calculating a total amount of variation in values counted by the hardware counter for each of the instruction addresses; and displaying the total amount of variation for each of the instruction addresses.

A computer-readable recording medium according to still another aspect of the present invention stores therein a computer program for realizing the performance analyzing method according to the above aspect.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail below with reference to the accompanying drawings.

Figure 1:
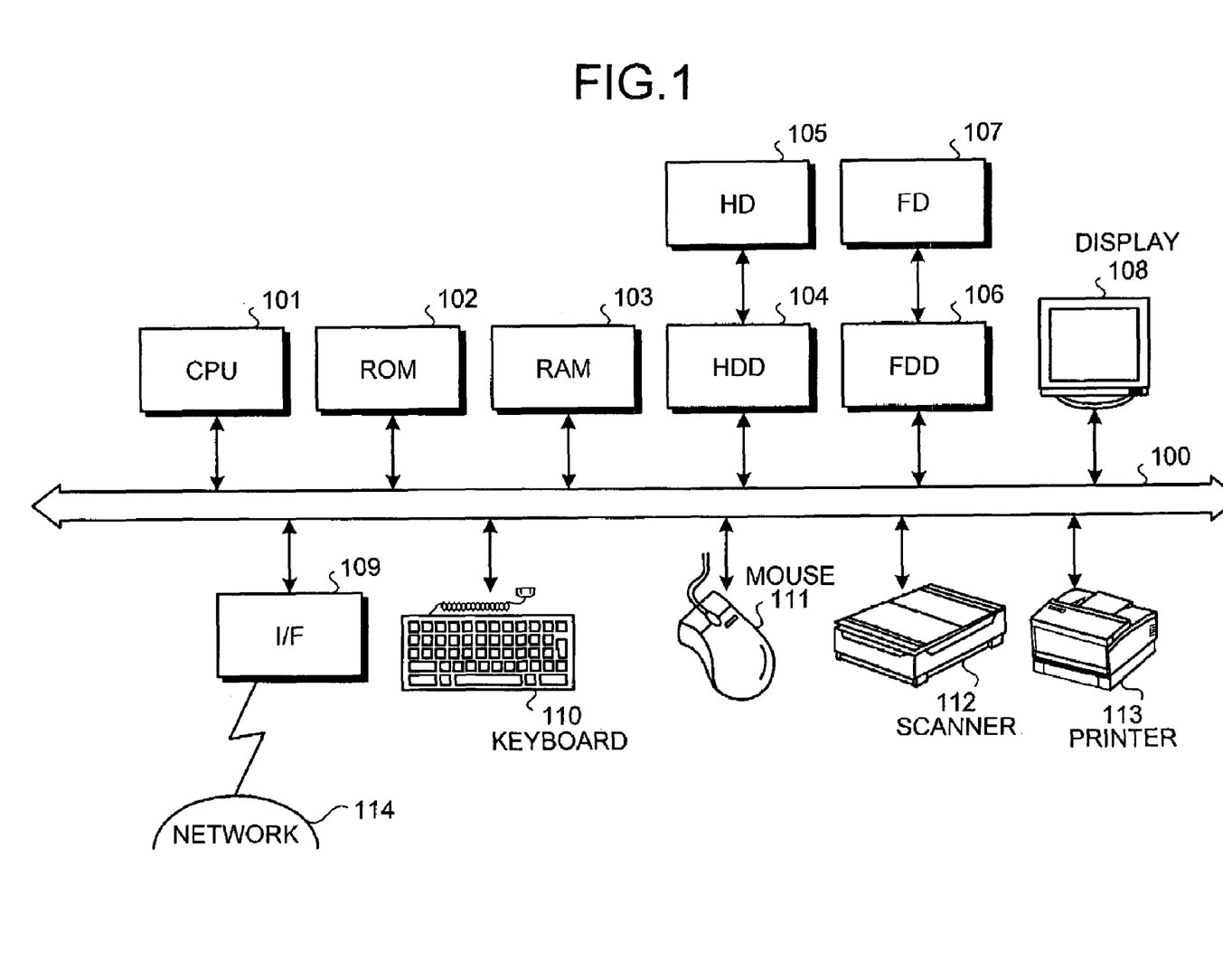
FIG. 1 is a schematic for illustrating a hardware configuration of a performance analyzing apparatus according to an embodiment of the present invention.

FIG. 1 is a schematic of a hardware configuration of a performance analyzing apparatus according to an embodiment of the present invention. As shown in FIG. 1, the performance analyzing apparatus includes a central processing unit (CPU) 101, a read-only memory (ROM) 102, a random access memory (RAM) 103, a hard disk drive (HDD) 104, a hard disk (HD) 105, a flexible disk drive (FDD) 106, a flexible disk (FD) 107 as an example of a removable recording medium, a display 108, an interface (I/F) 109, a keyboard 110, a mouse 111, a scanner 112, and a printer 113. Each component is connected via a bus 100 with each other.

The CPU 101 administers the control of the entire performance analyzing apparatus. The ROM 102 stores programs such as a boot program. The RAM 103 is used as a work area of the CPU 101. The HDD 104 controls reading/writing of data from/to the HD 105 according to the control of the CPU 101. The HD 105 stores data written according to the control of the HDD 104.

The FDD 106 controls reading/writing of data from/to the FD 107 according to the control of the CPU 101. The FD 107 stores the data written by the control of the FDD 106, causes the performance analyzing apparatus to read the data stored in the FD 107.

As a removable recording medium, in addition to the FD 107, a compact-disc read-only memory (CD-ROM), a compact-disc recordable (CD-R), a compact-disc rewritable (CD-RW), a magneto optical (MO) disk, a digital versatile disk (DVD), and a memory card may be used. In addition to a cursor, and icons or tool boxes, the display 108 displays data such as texts, images, functional information, etc. This display 108 may employ, for example, a cathode ray tube (CRT), a thin film transistor (TFT) liquid crystal display, a plasma display, etc.

The I/F 109 is connected with a network 114 such as the Internet through a communication line and is connected with external devices through this network 114. The I/F 109 administers an internal interface with the network 114 and controls input/output of data to/from external devices. For example, a modem, a local area network (LAN) adaptor, etc., may be employed as the I/F 109.

The keyboard 110 includes keys for inputting letters, digits, various instructions, etc., and executes input of data. The keyboard 110 may be a touch-panel input pad or a numeric key pad, etc. The mouse 111 executes shift of the cursor, selection of a region, or move and size change of windows. The mouse 111 may be a track ball or a joy stick that similarly includes the function as a pointing device.

The scanner 112 optically reads images and captures image data into the performance analyzing apparatus. The scanner 112 may have an optical character recognition (OCR) function. The printer 113 prints image data and text data. For example, a laser printer or an ink jet printer may be employed as the printer 113.

Figure 2:
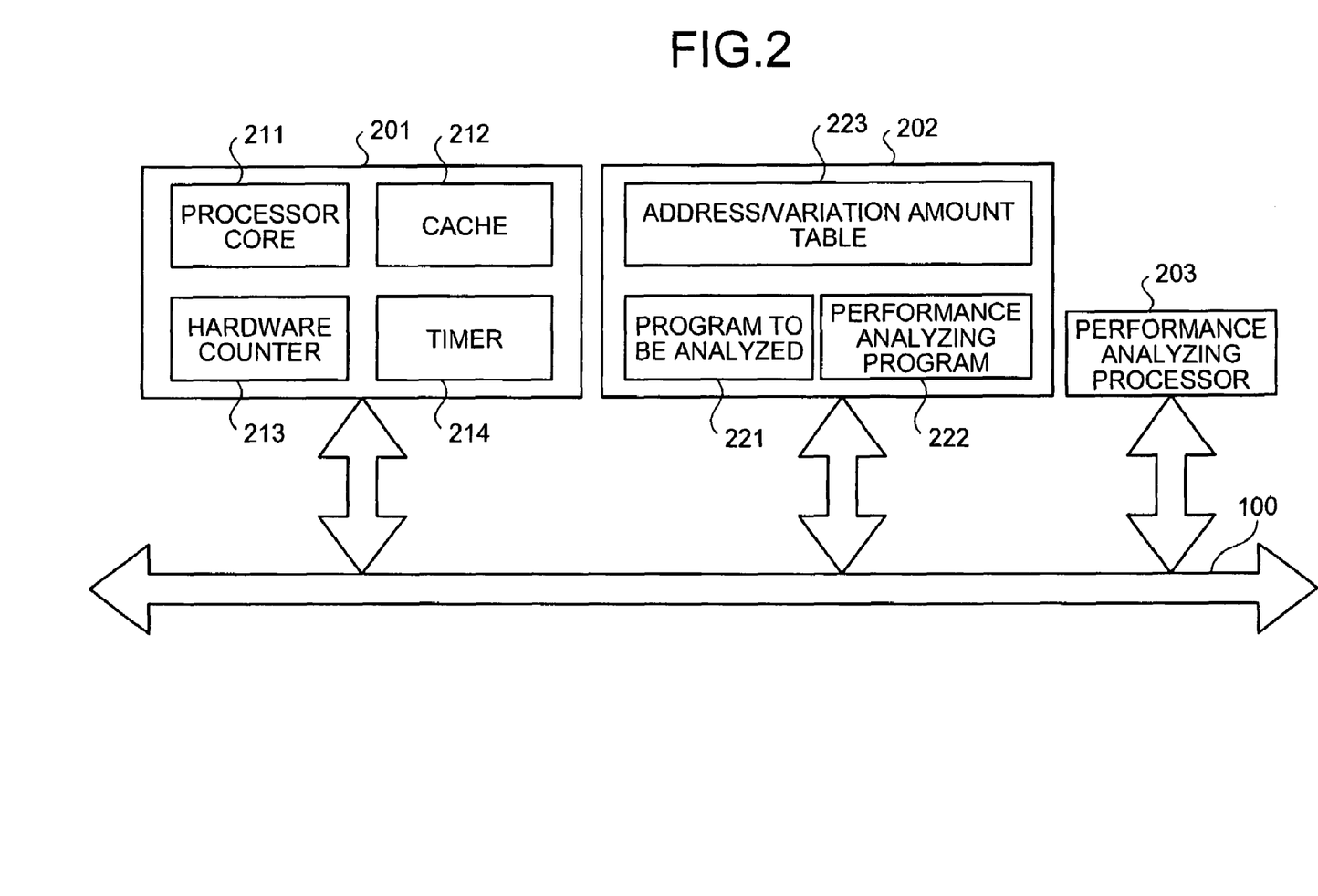
FIG. 2 is a block diagram of a partial hardware configuration of the performance analyzing apparatus shown in FIG. 1.

FIG. 2 is a block diagram of a partial hardware configuration of the performance analyzing apparatus shown in FIG. 1. The performance analyzing apparatus includes a measuring processor 201, a memory 202, and a performance analyzing processor 203. The measuring processor 201, the memory 202, and the analyzing processor 203 are respectively connected to the bus 100. The measuring processor 201 and the analyzing processor 203 correspond to the CPU 101 shown in FIG. 1. The memory 202 corresponds to the recording medium such as the ROM 102, the RAM 103, and the HD 105 shown in FIG. 1.

The measuring processor 201 includes a processor core 211 that handles various instructions, a cache 212 that retains data, a hardware counter 213 that monitors the performance by counting events in the processor and events of interactions with the exterior, and a timer 214 that outputs interrupt signals at regular intervals.

The hardware counter 213 starts counting upon execution of a program 221. The timer 214 also outputs interrupt signals at predetermined time intervals after the execution of the program 221 is started. The predetermined time intervals can be set in a performance analyzing program 222.

The memory 202 retains the program 221, the performance analyzing program 222, and an address/variation amount table 223. The program 221 is software of which the performance is to be monitored. The performance analyzing program 222 is software to analyze the performance of the program 221.

The address/variation amount table 223 is created during the performance analysis of the program 221. The performance analyzing processor 203 executes the performance analyzing program 222. The performance analyzing processor 203 may be used simultaneously as the measuring processor 201.

Figure 3:
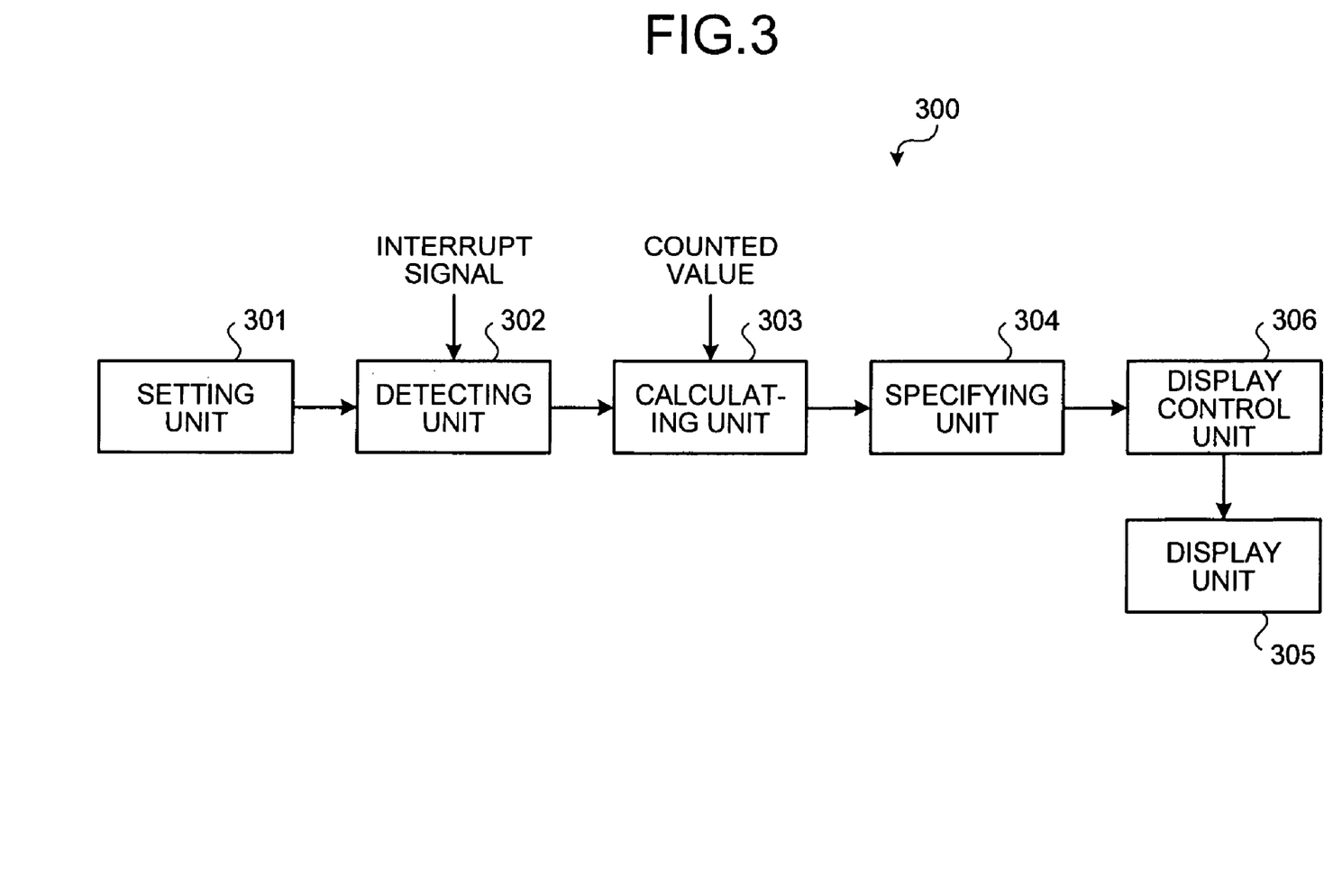
FIG. 3 a block diagram of a functional configuration of the performance analyzing apparatus.

FIG. 3 is a block diagram of a functional configuration of the performance analyzing apparatus. As shown in FIG. 3, a performance analyzing apparatus 300 includes a setting unit 301, a detecting unit 302, a calculating unit 303, a specifying unit 304, a display unit 305, and a display control unit 306.

The setting unit 301 sets an event for which the number of times of occurrence is counted by the hardware counter 213 in the measuring processor 201 on which the program 221 is executed. The "event" includes events generated by the measuring processor 201 such as an instruction, a cache mistake, a translation look-aside buffer (TLB) mistake, an execution instruction parallel degree, a branch instruction, the register interference cycle number, a pipeline stall, memory traffic, bus load information, etc., that are executed by the measuring processor 201 when the program 221 is executed.

When the event is set by the setting unit 301, the hardware counter 213 counts the number of times of occurrence of the event. For example, when the cache mistake is set as the event, the hardware counter 213 counts the occurrence of the cache mistake and does not count events other than the cache mistake.

During the execution of the program 221, the detecting unit 302 detects the instruction address at the time of generation of interrupt signals generated at predetermined time intervals from the measuring processor 201. The "instruction address" is the position of a program of an assembly instruction executed by the measuring processor 201 when the program 221 is executed. More specifically, the detecting unit 302 detects an instruction address for the time when the execution of the program 221 is stopped by an interrupt signal output from the timer 214 in the measuring processor 201. Hereinafter, the instruction address detected by this detecting unit 302 is referred to as "detected instruction address".

For each detected instruction address, the calculating unit 303 calculates the total amount of variation in values counted by the hardware counter 213 for each detected instruction address. Specifically, for each detected instruction address, the counted value of the hardware counter 213 at the time of the detection (that is, at the time when an interrupt signal is generated) is read. The variation amount in the counted value is calculated by subtracting the counted value at the time of the previous generation of the interrupt signal from the counted value at the time of generation of the current interrupt signal. Thus, the variation amount of the event from the previous interrupt to the current interrupt is obtained.

Figure 4:
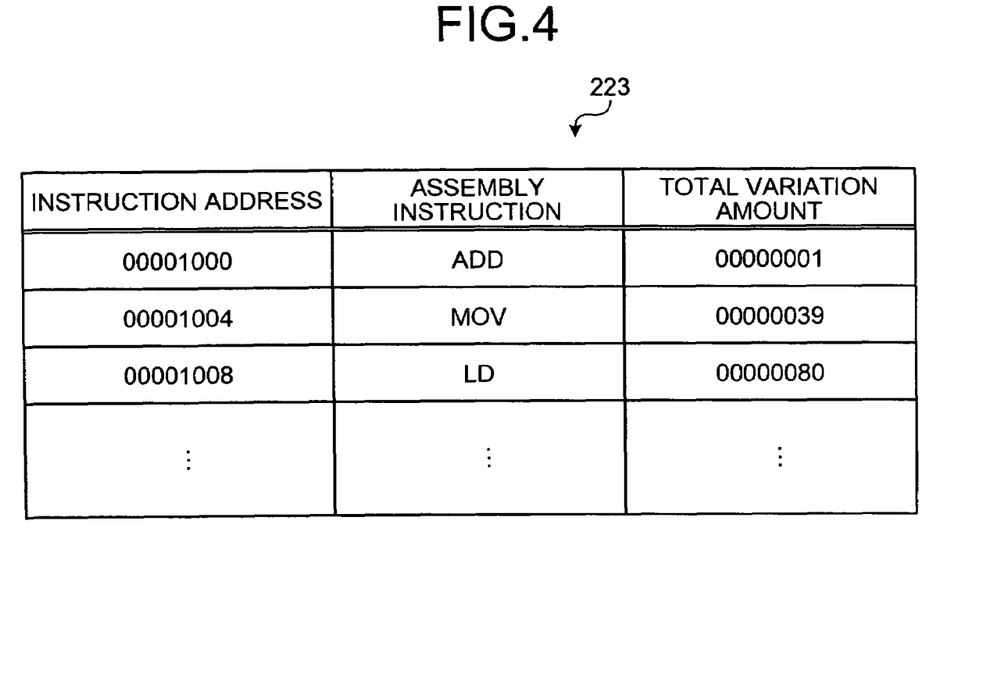
FIG. 4 is a schematic of an address/variation amount table.

Representing this variation amount as $\Delta P$, the variation amount $\Delta P$ is accumulated for each detected instruction address. Thus, the total variation amount $\Delta P$ can be obtained for each detected instruction address. FIG. 4 is a schematic of the address/variation amount table 223. In the example shown in FIG. 4, although assembly instructions of the detected instruction addresses are correlated for convenience, the calculating unit 303 does not recognize the assembly instructions and only correlates the detected instruction addresses with the total variation amount.

The specifying unit 304 specifies an instruction address that corresponds to the event from the instruction addresses. Instruction addresses of the assembly addresses that have no relation with the event are included in the address/variation amount table 223 shown in FIG. 4. Therefore, the instruction address that corresponds to the event is specified.

For example, the assembly instruction that corresponds to the cache mistake is "LD" (load). When the event is the cache mistake, an instruction address of assembly instruction LD is specified from the detected instruction addresses shown in FIG. 4. Correspondence of instruction addresses to assembly instructions can be obtained from the source code of the program 221.

The display unit 305 corresponds to the display 108 shown in FIG. 1 and displays various images and texts on a display screen according to the control of the display control unit 306. The display control unit 306 controls the display screen to display the total variation amount ΔP for each instruction address. The display control unit 306 controls to display, for example, a graph showing the total variation amount ΔP of each instruction address.

Figure 5A:
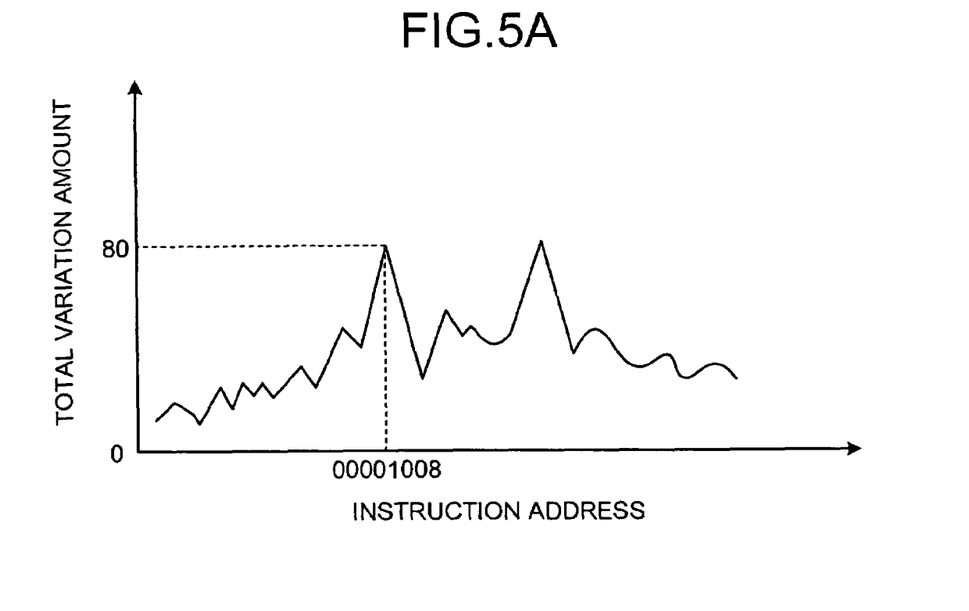
FIG. 5A is a graph of a total variation amount for each instruction address.

FIG. 5A is a graph of the total variation amount ΔP for each instruction address. The axis of abscissa represents the instruction address and the axis of ordinate represents the total variation amount ΔP. The total of the variation amount of the instruction address that corresponds to an event can be visually recognized by highlighting the instruction address specified by the specifying unit 304 (the instruction address corresponding to the event).

The highlighting may be displayed so that the instruction address and the total variation amount thereof can be distinguished from other instruction addresses and other totals, and the various form of the highlighting may be applied. For example, the instruction address corresponding to the event is displayed in a size or a color different from that of other instruction addresses, or the region of the total variation amount of the instruction address corresponding to the event on the graph is displayed in a color different from that of other regions.

The display control unit 306 may control to display the total variation amount for each instruction address based on an execution unit including an assembly instruction of the instruction address. The "execution unit" is a function including the assembly instruction itself of the instruction address, a process including the assembly instruction (for example, an integrated text description such as a "for" text), and an assembly instruction.

Figure 5B:
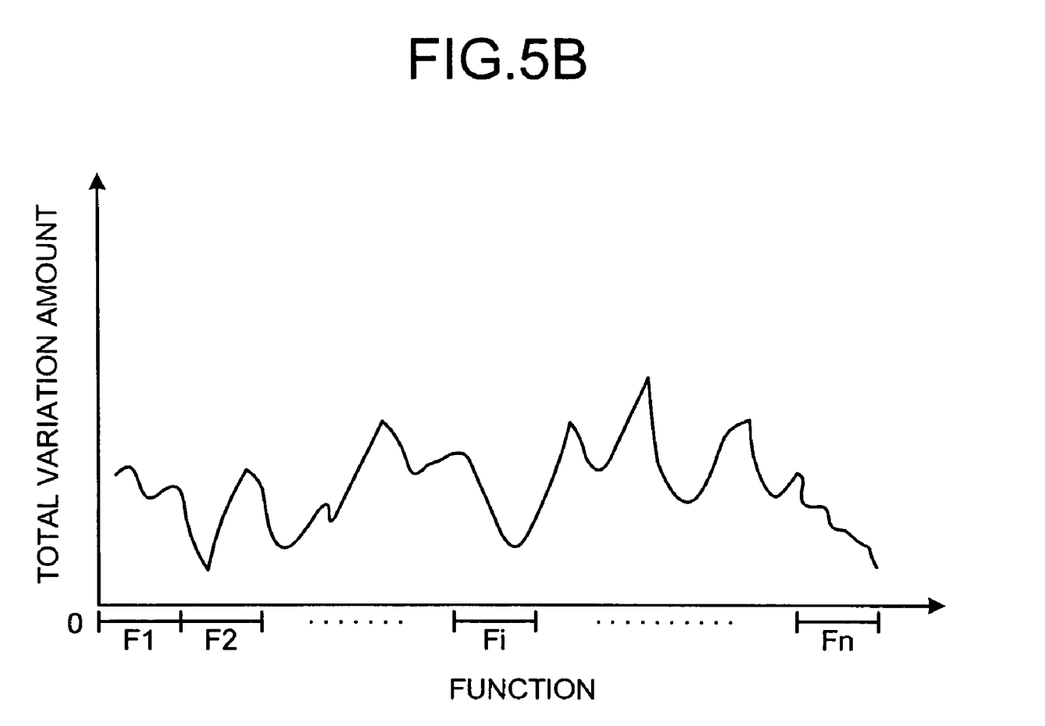
FIG. 5B is a graph of a total variation amount for each function.

The axis of abscissa of the graph shown in FIG. 5A represents the execution unit, and the total variation amount on the axis of ordinate is varied in response to the execution unit on the axis of abscissa. A graph obtained when the execution unit is a function Fi (F1 to Fn) is shown in FIG. 5B. FIG. 5B is a graph showing the total variation amount ΔP for each function Fi.

Specifically, the setting unit 301, the detecting unit 302, the calculating unit 303, the specifying unit 304, and the display control unit 306 shown in FIG. 3 realize the functions thereof by causing the CPU 101 to execute programs recorded on a recording medium, such as the ROM 102, the RAM 103, the HD 105, etc., or by the I/F 109 shown in FIG. 1.

Figure 6:
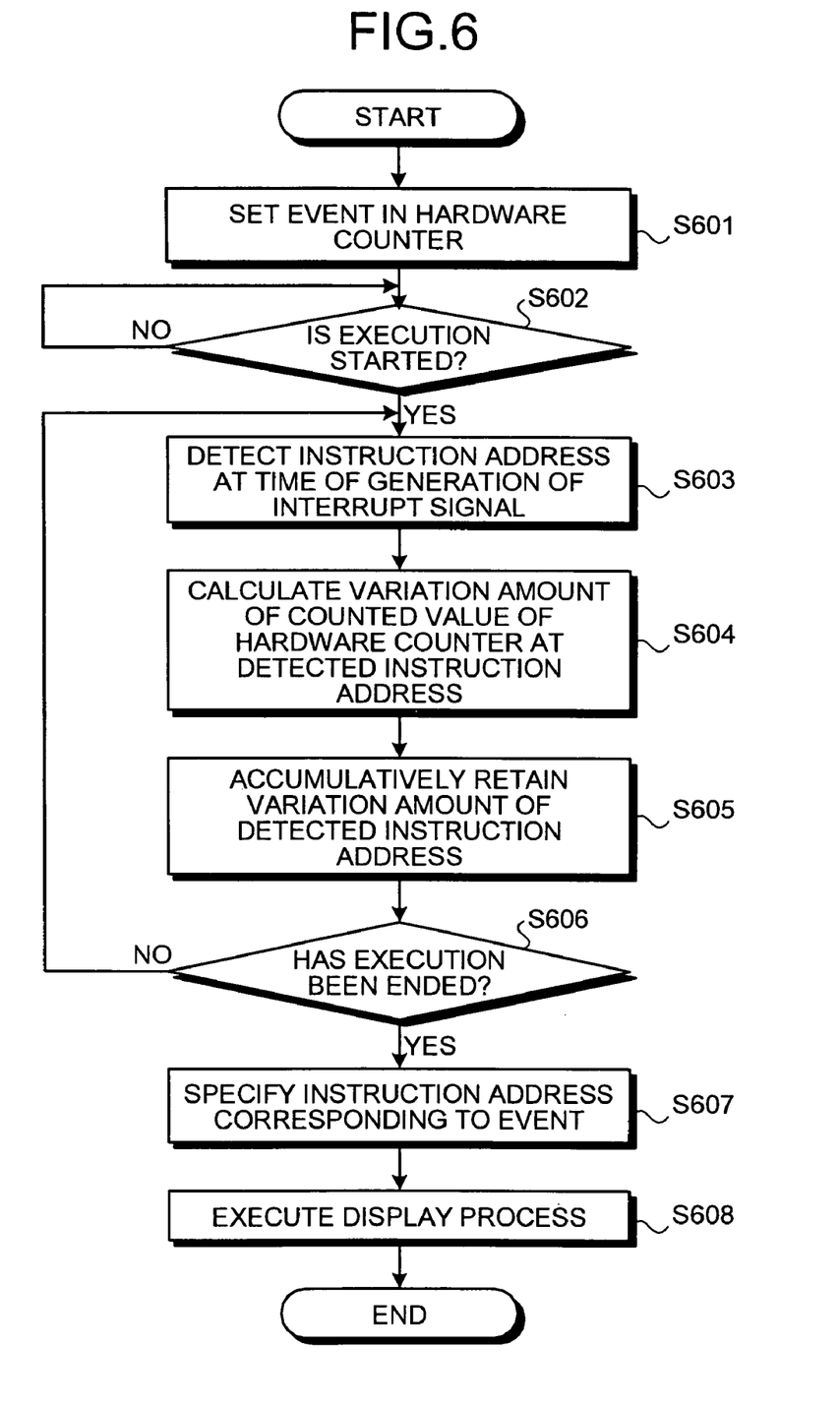
FIG. 6 is a flowchart of a performance analyzing process by the performance analyzing apparatus.

FIG. 6 is a flowchart of a performance analyzing process performed by the performance analyzing apparatus 300. As shown in FIG. 6, an event of which the performance is desired to be monitored is set in the hardware counter 213 by the setting unit 301 (step S601).

It is waited until the program 221 starts to be executed (step S602). When the program 221 is started to be executed (step S602: YES), an instruction address at the time of generation of an interrupt signal from the timer 214 is detected by the detecting unit 302 (step S603).

The variation amount ΔP of the counted value by the hardware counter 213 at the detected instruction address is calculated (step S604) and the variation amount ΔP is accumulated and retained for each detected instruction address (step S605). Whether the execution of the program 221 is ended is judged (step S606).

When the execution is not yet ended (step S606: NO), the procedure is returned to step S603 and an instruction address at the time of generation of the next interrupt signal is detected. When the execution has been ended (step S606: YES), the procedure is advanced to step S607. At this stage, the address/variation amount table 223 shown in FIG. 4 is completed.

The instruction address corresponding to the event is specified by the specifying unit 304 (step S607). The display control unit 306 controls to display a graph of the total variation amount as shown in FIG. 5A or 5B on the display screen (step S608). Thus, a series of processes is ended.

As described above, according to the embodiment, the counted value that indicates the number of times of occurrence of various events that has been ambiguous as the entire specific section can be visually displayed as a function, a process, and an assembly instruction position that correspond to the event. Therefore, tuning and design for the program 221 and the system can be performed easily and accurately.

For example, when the cache mistake is set as an event, it can be quickly found out that the cache mistake has occurred around the instruction address thereof. Therefore, it is possible to correct the program 221 taking various measures against cache mistakes (pre-fetching, etc.) and improvement of the performance of the program 221 can be facilitated. In this manner, accurate tuning can be performed by analyzing inhibiting factors against performance improvement that correspond to the counted values of the hardware counter 213.

Moreover, by visualizing section information of the fine grain degree, information that can not be captured as the average value can be obtained as new indexes such as the minimum/maximum, the value of dispersion, etc., and can be utilized in design and tuning of the program 221 and a system, and as a new "index for characterizing analyses".

As described above, according to the performance analyzing apparatus 300, the performance analyzing method, the performance analyzing program 222, and the recording medium of the embodiments of the present invention, the tuning point of the program 221 can be easily and apparently presented only with the existing hardware configuration of a processor.

The performance analyzing method described in the embodiment can be realized by executing a program prepared in advance on a computer such as a personal computer, a work station, etc. This program is recorded on a computer-readable recording medium such as a hard disk, a flexible disk, a CD-ROM, an MO, a DVD, etc., and is executed by being read from the recording medium by the computer. This program can be distributed through a network such as the Internet.

According to the embodiments described above, a tuning point of a program to be analyzed can be easily and apparently presented with only the existing hardware configuration of a processor.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A performance analyzing apparatus comprising:
a computer processor
to generate interrupt signals only at given time intervals while executing a program to be analyzed, the processor including a hardware counter that counts a cumulative number of a type of a hardware event executable by the computer processor when the program is executed,
to detect each instruction address that is executed at a time of generation of each interrupt signal at the given time interval, respectively, and
to calculate a difference between values of the hardware counter for the type of hardware event for each detected instruction address at the time of generation of each interrupt signal at the given time interval; and
a display to display the difference and each instruction address.

2. The performance analyzing apparatus according to claim 1,
wherein the computer processor further sets the type of the hardware events to be counted by the hardware counter, and
wherein the type of hardware events comprises one or more of an execution of an instruction, a cache miss, a translation look-aside buffer (TLB) miss, a degree of parallel execution of instructions, a branch instruction, a number of cycles of register interference, a pipeline stall, memory traffic, or bus load information.

3. The performance analyzing apparatus according to claim 1, wherein the computer processor further specifies an instruction address that corresponds to a given event from among the instruction addresses, and
wherein the display is configured to highlight the specified instruction address.

4. The performance analyzing apparatus according to claim 1, wherein the display is configured to display the difference in association with a function including an instruction of the instruction addresses.

5. The performance analyzing apparatus according to claim 3, wherein the display is configured to display the difference in association with a function including the instruction addresses.

6. A performance analyzing method comprising:
setting a hardware event executable by the computer processor when the program is executed, for which number of times of occurrence are counted by a hardware counter provided in a processor on which a program to be analyzed is executed;
detecting each instruction address that is executed at a time of generation of each interrupt signal, respectively, that is generated at a predetermined time interval from the processor while the program is being executed;
calculating a difference between values of the hardware counter for the type of hardware event for each detected instruction address at the time of generation of each interrupt signal at the predetermine time interval; and
displaying the difference and each instruction address on a display.

7. The performance analyzing method according to claim 6, further comprising specifying an instruction address that corresponds to a given event from among the instruction addresses, wherein
the displaying includes highlighting the specified instruction address.

8. The performance analyzing method according to claim 6, wherein the displaying includes displaying the difference in association with function including an instruction of the instruction addresses.

9. The performance analyzing method according to claim 7, wherein the displaying includes displaying the difference in association with a function including an instruction of the instruction addresses.

10. A computer-readable recording medium that stores therein a computer program for realizing a performance analyzing method on a computer, the computer program making the computer execute:
setting a hardware event executable by the computer processor when the program is executed, for which number of times of occurrence are counted by a hardware counter provided in a processor on which a program to be analyzed is executed;
detecting each instruction address that is executed at a time of generation of each interrupt signal, respectively, that are generated at a predetermined time interval from the processor while the program is being executed;
calculating a difference between values of the hardware counter for the type of hardware event for each detected instruction address at the time of generation of each interrupt signal at the predetermine time interval; and
displaying the difference and each instruction address on a display.

11. The computer-readable recording medium according to claim 10, wherein the computer program further makes the computer execute specifying an instruction address that corresponds to a given event from among the instruction addresses, wherein
the displaying includes highlighting the specified instruction address.

12. The computer-readable recording medium according to claim 10, wherein the displaying includes displaying the difference in association with function including an instruction of the instruction addresses.

13. The computer-readable recording medium according to claim 11, wherein the displaying includes displaying the difference in association with a function including an instruction of the instruction addresses.

* * * * *